INVENTOR
Arthur Kenneth Baker
BY Sparrow and Sparrow
ATTORNEYS

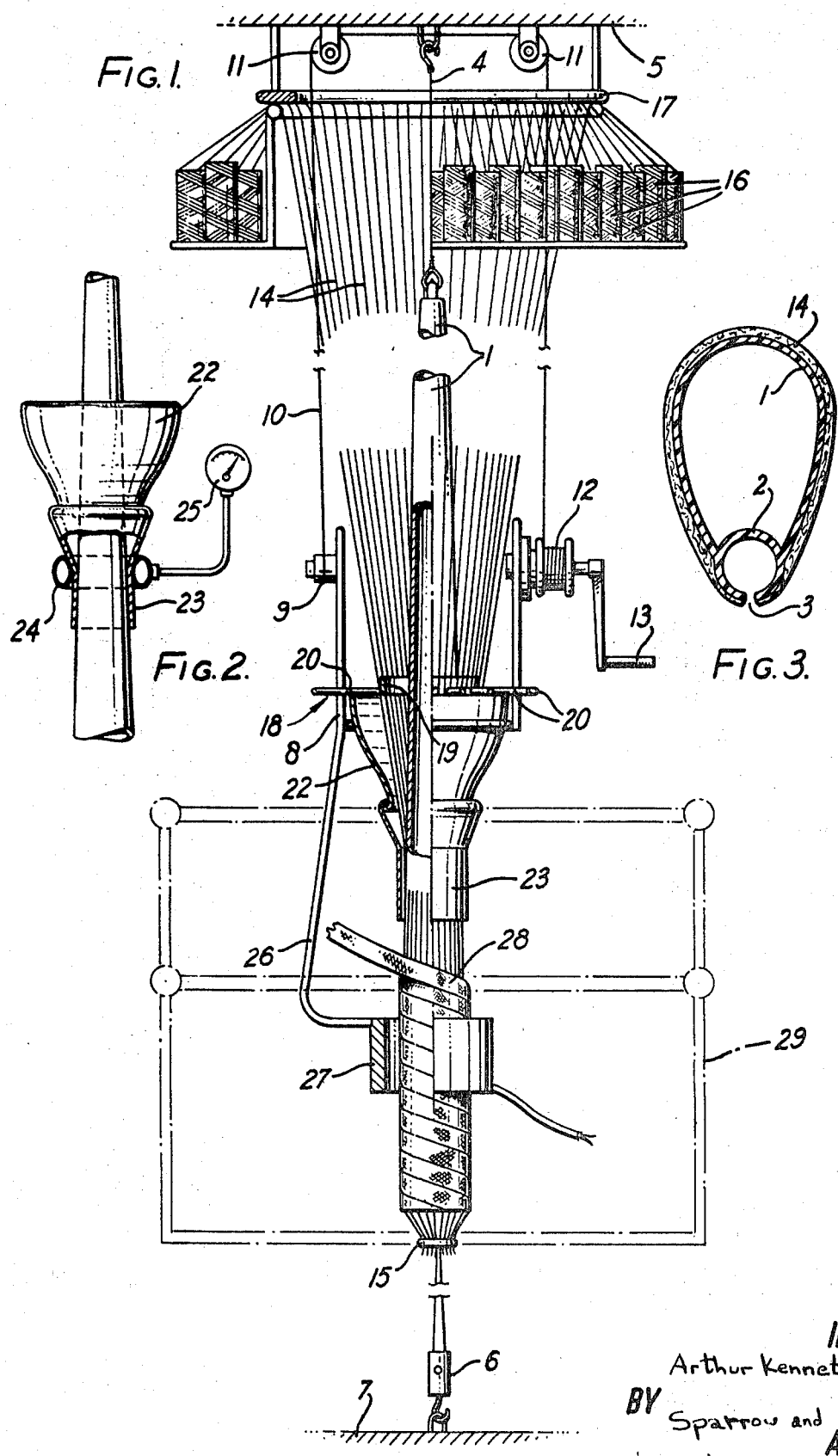

United States Patent Office  3,578,529
Patented May 11, 1971

3,578,529
APPARATUS FOR PRODUCING REINFORCED PLASTICS MATERIAL ARTICLES
Arthur Kenneth Baker, Woodlands, Cut-a-Thwart Lane, Woodham Walter, Maldon, Essex, England
Filed May 27, 1968, Ser. No. 732,211
Int. Cl. B32b 23/02
U.S. Cl. 156—393                                   6 Claims

ABSTRACT OF THE DISCLOSURE

The invention is particularly applicable to the production of comparatively long hollow reinforced tubular components such as tapering masts or spars, the invention covering an apparatus comprising a carrier for spools of strands of reinforcing material, means for uniformly distributing and laying said strands progressively longitudinally on a former or shell whilst the latter is supported in a vertical position, a bath for containing synthetic resin surrounding said former or shell and through which said strands are adapted to pass during laying and thus become impregnated with resin, said bath at its lower end including a tubular resilient neck portion adapted to fit closely around said strands as they are laid on said shell or former to consolidate said strands and control the resin content and means for moving said bath vertically upwardly throughout the length of said shell or former until the laying process is completed.

---

Figure 4:
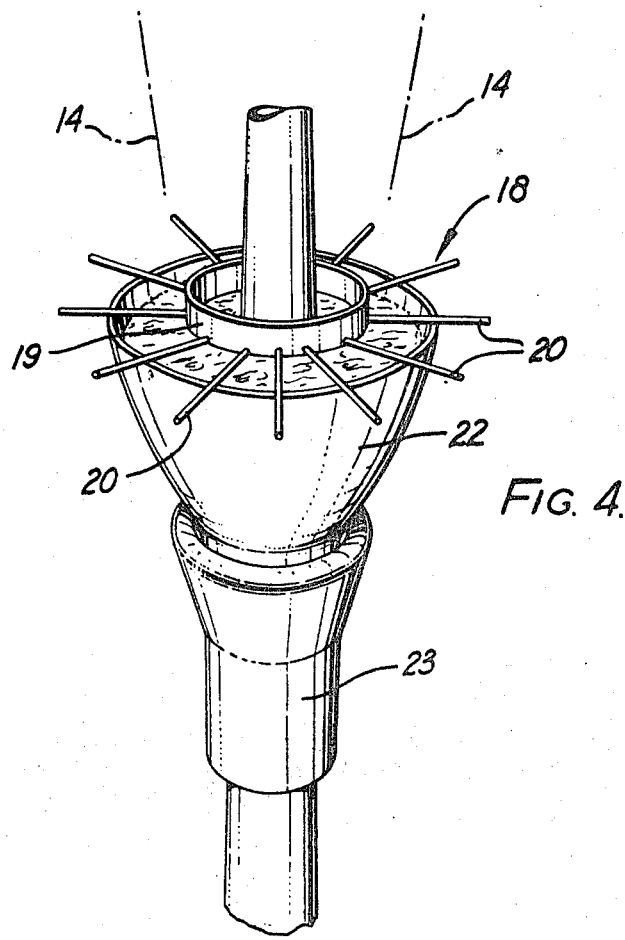

This invention relates to apparatus for producing reinforced plastics material articles from strands of glass fibre or other suitable reinforcing material impregnated with a suitable synthetic resin material such as for example a polyester resin, the strands being laid longitudinally on a former or shell progressively throughout its length.

Although it has previously been proposed to produce hollow reinforced plastics material articles from strands of glass fibre or other suitable reinforcing material laid longitudinally on a former drawn through a bath of synthetic resin enclosing the former and strands the customary methods of fabricating tubular and bar sections in reinforced plastic such as moulding, filament winding, cloth or mat lay-up and modified forms of extrusion have limitations when applied to the manufacture of relatively long members designed for maximum resistance to bending and/or end load. For these conditions reinforcing fibres are most effective when disposed longitudinally in the member and the apparatus later described is designed to facilitate this construction.

An example of the type of member which can be produced simply and consistently according to this invention is the mast of a sailing boat. It is slender and may be tapered over its length. Loadings are complex and for optimum performance at minimum weight a hollow circular or elliptical section is most effective. A sail track may be required as an integral part of the mast and embedding of electrical cables, rigging attachments and various brackets is desirable. Articles in a similar category are radio masts, lamp posts and poles for supporting wires and cables. Also, struts, props, stanchions and other structural components can be fabricated by this method.

Since the members to which this form of construction best applies are usually slender, hollow and parallel or have only a small degree of taper, the simple method of wrapping and impregnating reinforcement on a mandrel is excluded by virtue of laminate shrinkage which takes place during hardening and prevents withdrawal. A collapsible mandrel may be used but it is costly. A permanent core of balsa wood, expanded rubber or plastic or other suitable materials can also be used but the extra cost is not usually accompanied by a corresponding increase in member strength. Nevertheless, for the manufacture of "one-off" articles this form of construction is worth consideration. For quantity fabrication however, cores can be produced economically in the manner hereinafter described.

The chief object of the present invention is to evolve an apparatus for applying the reinforcing material and resin onto a pre-formed core which preferably but not necessarily forms a part of the completed structure and if required instigating the setting-off of the resin under conditions of heat to produce a hollow reinforced synthetic resin article having a maximum resistance to bending and/or end load.

Apparatus in accordance with the present invention for producing hollow plastics material articles comprises a carrier for spools of strands of reinforcing material, means for uniformly distributing and laying said strands progressively longitudinally on a former or shell whilst the latter is supported in a vertical position, a bath for containing synthetic resin surrounding said former or shell and through which said strands are adapted to pass during laying and thus become impregnated with resin, said bath at its lower end including a tubular resilient neck portion adapted to fit closely around said strands as they are laid on said shell or former to consolidate said strands and control the resin content and means for moving said bath vertically upwardly throughout the length of said shell or former until the laying process is completed.

A tubular heater in the form of a collar may be provided situated beneath the resin bath and surrounding the former or shell and laid rovings for accelerating setting off of the resin or the resin may include an accelerator which will cause the resin to set-off without additional heat.

Preferably the tubular heater if employed is spaced sufficiently far below the resin bath to enable the strands which have been laid to be wrapped with woven glass tape prior to the aplication of heat.

Figure 5:
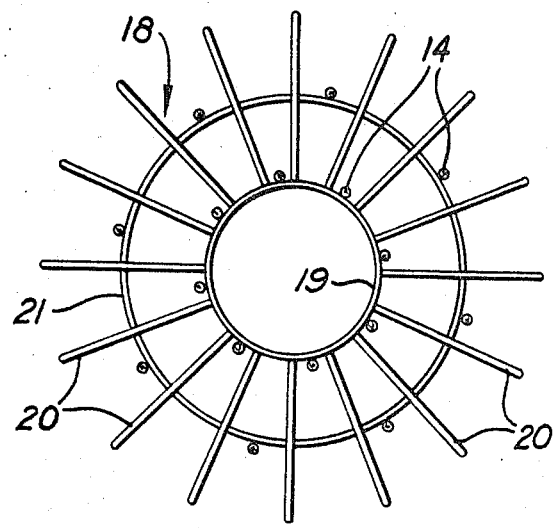

Referring to the accompanying drawings:
FIG. 1 is a side elevation of the preferred form of apparatus partly in section;
FIG. 2 illustrates one method of applying pressure to the rovings after laying;
FIG. 3 is a cross-section of a mast constructed in accordance with the invention;
FIG. 4 is a perspective view of a roving distributor spider associated with the resin bath; and
FIG. 5 shows in plan view an alternative spider.

The invention is hereinafter described in the production of a hollow mast for a sailing boat, such as mast being shown in cross-section in FIG. 3 but is applicable to the construction of any other suitable tubular component of parallel or tapering form.

Although it is within the scope of the invention to use a former or mandrel which is removed after the hollow member has been constructed, the mandrel being treated or wrapped with a suitable release agent to facilitate removal it is preferred to first of all produce a hollow shell on a suitable mandrel by any suitable method such as for example the application of one or more layers of glass fibre mat and resin.

The shell thus formed is indicated by reference numeral 1 in FIG. 3, the shell being slit longitudinally to facilitate its removal from the mandrel or former and either subsequently joined together at the slit or the slit opened to accommodate a tubular subsidiary shell 2 intended in the case of the mast illustrated to form a track tube which is slotted longitudinally as at 3 after the mast has been completed. Subsidiary shell 2 may be produced by winding woven glass fibre tape onto a circular mandrel or former and impregnated with resin, the mandrel being subsequently removed, the two shells being secured together with resin as in FIG. 3.

To avoid possibility of warping during or after construction of the mast, the composite shell 1, 2 is suspended vertically by a support 4 from the roof 5 and connected at its lower end by a fastening 6 to the floor 7, the composite shell being preferably maintained under tension during completion of the mast in the manner hereinafter described.

The apparatus for carrying out the present invention includes a frame 8 which surrounds the composite shell, the frame having an attachment point 9 for a cable 10 passing over pulleys 11 and connected to hoisting gear 12 driven by a crank handle 13. In FIG. 1 the apparatus is shown diagrammatically as normally the distance separating the lower end of the composite shell from the floor must be such as to allow the rovings 14 to be laid progressively in an upward direction from the lower end of the composite shell. The rovings 14 consist of a number of glass strands gathered together as a yarn and are laid on the composite shell in a pattern predetermined by the laminate thickness required, the rovings being impregnated with resin during laying in a manner hereinafter described.

A sufficient number of rovings are used to cover the lower end of the composite shell which is of maximum circumference and to produce the required density of coverage, the rovings being secured at their lower ends to an attachment member 15, the rovings being drawn from reels or spools 16 carried by a feed grid 17 suspended from the roof or upper end of the working bay.

The rovings 14 are distributed by a distributor 18 such as is illustrated in detail in FIGS. 4 and 5, the distributor in both cases consisting of a spider comprising an annular ring 19 carrying radially projecting arms 20 which maintain the rovings in correct relationship during laying. In FIG. 5 a second outer ring 21 is provided in which case the rovings associated with the inner annular ring 19 will be laid first, the outer rovings either being laid between the inner rovings or forming a second outer layer, the alternative distributor being used for example when a thicker or denser layer of reinforcing members are to be laid at one time. The distributor may also be used to lay at the same time electrical conducting wires along with the rovings.

The roving distributor rests on the upper edge of a resin container 22 through which the rovings and the composite shell pass, the container having a central aperture at its lower end with which is associated a tubular gaiter or compression sleeve 23 composed for example of rubber or other flexible material and fitting closely over the rovings as they are laid and remove surplus resin by a wiping action.

The compression sleeve 23 may be urged more firmly into operative engagement with the rovings by an inflated ring 24 as in FIG. 2, the ring being inflated to a suitable pressure as indicated by the pressure gauge 25.

The frame 8 carries a depending arm 26 supporting an electrically heated collar 27 enclosing the composite shell, laid rovings, and a spirally wound on woven glass, cotton or other tape 28 which is finally applied to give the outer surface of the article produced, a smooth finish. The heating collar induces gelling of the synthetic resin, reduction in the "pot life" of the resin in the container being avoided by the addition of chemical compounds to accelerate gelling. As previously stated if accelerators are used to cause the resin to set-off without additional heat the heated collar may be omitted.

The frame 8 may also carry a platform 29 on which an operator can stand, the operator and platform being raised as the work proceeds by turning the handle 13, the operator being therefore always at the correct working position. If required the hoist 12 may be driven by an electric motor controlled from the platform.

The apparatus hereinbefore described is used in the following manner in the production of a mast or other tubular article.

The composite shell of the mast depicted in FIG. 3 or a suitable mandrel or former is suspended vertically as in FIG. 1 and the frame 8 lowered to its maximum extent.

The requisite number of rovings are drawn from the spools, passed through the distributor 18 in their correct positions, passed through the empty resin container 22, compression sleeve 23 and heated collar 27 and attached to the part 15.

The container 22 is then filled with resin, the heater 27 switched on, the frame raised to lay the rovings and impregnate them with resin. As the laid rovings are exposed as a result of raising the frame, tape 28 is wound on. The heater then comes into operation to progressively gel the resin content of the structure as the tape is wound on. As work proceeds and due to the fact that the component tapers in an upward direction, the number of rovings required to cover the peripheral surface of the composite shell or mandrel will decrease and consequently some of the rovings may be cut as the work proceeds until the minimum number is reached necessary to cover the requisite thickness the upper comparatively thin end of the mast.

After the resin has set-off the mast or the like is removed and in the case of a mast such as is shown in FIG. 3 the slot 3 is cut.

If formed on a mandrel, the latter will of course be removed but in the case of the mast shown in FIG. 3 the composite shell forms an integral part of the completed structure.

It will be appreciated that the number of rovings passed through the distributor will to a certain extent depend upon the density and wall thickness required. Consequently although in FIG. 5 only one roving is shown between each pair of arms, a number of rovings may be actually bunched together.

In some cases it may be preferred to use a small capacity container for the resin which is periodically or continually replenished by a feed pipe from a larger reservoir.

The tubular sleeve 23 is of such a length and diameter as to grip the rovings and may in fact pre-tension the rovings to a certain degree during laying. As previously explained this grip may be amplified by an inflatable ring or any other spring or elastic device may be used in substitution.

The heating collar 27 contains electrical heating elements which are preferably arranged to give several temperature ranges by selection.

Normally excess resin exuded through the tape will impart a good surface finish to the mast but should an improved surface finish be required cellophane sheet or strip may be applied over the resin coating.

I claim:
1. Apparatus for producing hollow reinforced plastics material articles comprising a carrier for spools of strands of reinforcing material, means for uniformly distributing and laying said strands progressively longitudinally on a former or shell while the latter is supported in a vertical position, a bath for containing synthetic resin surrounding said former or shell and through which said strands are disposed to pass during laying and thus become impregnated with resin, said bath at its lower end including a tubular resilient neck portion disposed to fit closely around said strands as they are laid on said shell or former to consolidate said strands and control the resin content, means for moving said bath vertically upwardly throughout the length of said shell or former until the laying process is completed, and said resilient neck portion of said bath consisting of a tubular gaiter composed of resilient flexible material such as rubber.

2. Apparatus as claimed in claim 1, including an inflatable ring surrounding said gaiter which when inflated will urge the walls of said gaiter more firmly into operative engagement with said strands.

3. Apparatus as claimed in claim 2 including a tubular heater situated beneath said bath and surrounding said strands, sad heater having structure means connecting the former with said bath for moving both simultaneously as said strands are laid.

4. Apparatus as claimed in claim 1 wherein the means for uniformly distributing said strands comprises a radial arm spider located above the resin bath and movable therewith, the arms of the spider serving to maintain the strands in correctly spaced relationship during laying.

5. Apparatus as claimed in claim 3, including a hoist associated with a frame carrying the resin bath by which said bath can be gradually raised as the laying of the strands proceeds.

6. Apparatus as claimed in claim 5, including a platform raisable by means of said hoist together with said resin bath on which platform an operator can stand and operate the hoist.

References Cited

UNITED STATES PATENTS

| | | | |
|---|---|---|---|
| 864,168 | 8/1907 | Hinsky | 156—393 |
| 2,478,940 | 8/1949 | Pape | 156—393 |
| 3,068,133 | 12/1962 | Cilker et al. | 156—433X |
| 3,202,563 | 8/1965 | Charvet | 156—203X |
| 3,433,696 | 3/1969 | Michael | 156—433X |
| 3,437,537 | 4/1969 | Takada | 156—393X |

BENJAMIN A. BORCHELT, Primary Examiner

R. E. HART, Assistant Examiner

U.S. Cl. X.R.

156—203, 433, 434, 441